United States Patent [19]

Eberhardt et al.

[11] Patent Number: 5,045,858
[45] Date of Patent: Sep. 3, 1991

[54] SIDELOBE IDENTIFICATION AND DISCRIMINATION SYSTEM WITH SIGNAL MULTIPLEXER-SEPARATOR

[75] Inventors: Paul R. Eberhardt, Encinitas; William F. McNaul, Ramona, both of Calif.

[73] Assignee: Cubic Defense Systems, Inc., San Diego, Calif.

[21] Appl. No.: 395,275

[22] Filed: Aug. 16, 1989

[51] Int. Cl.⁵ .......... G01S 3/16; G01S 13/52; H04J 3/00; G06G 7/00

[52] U.S. Cl. .................. 342/379; 342/160; 370/109; 307/529

[58] Field of Search ........... 342/379, 380, 383, 160, 342/195; 370/109, 7; 307/525, 529

[56] References Cited

U.S. PATENT DOCUMENTS

| | | | |
|---|---|---|---|
| 2,403,561 | 7/1946 | Smith | 177/353 |
| 3,248,731 | 4/1966 | Bickmore et al. | 343/100 |
| 3,292,175 | 12/1966 | Brandon et al. | 343/17.2 |
| 3,512,160 | 5/1970 | Meeker | 343/200 |
| 3,541,265 | 11/1970 | Greefkes | 179/15 |
| 3,725,926 | 4/1973 | Ares | 343/17.5 |
| 3,735,266 | 5/1973 | Amitay | 325/60 |
| 3,843,930 | 10/1974 | Burnsweig | 328/155 |
| 3,939,411 | 2/1976 | James | 324/77 |
| 4,005,417 | 1/1977 | Collins | 343/5 SA |
| 4,070,675 | 1/1978 | Daniel et al. | 342/380 |
| 4,143,372 | 3/1979 | Salvandon et al. | 343/16 M |
| 4,152,702 | 5/1979 | Piesinger | 343/100 |
| 4,162,497 | 7/1979 | Hulland et al. | 343/100 |
| 4,250,506 | 2/1981 | McNaul | 343/100 |
| 4,266,226 | 5/1981 | McNaul et al. | 343/100 |
| 4,307,399 | 12/1981 | Love et al. | 343/16 |
| 4,309,769 | 1/1982 | Taylor, Jr. | 375/1 |
| 4,612,549 | 9/1986 | Geyer, Jr. et al. | 343/379 |
| 4,649,392 | 3/1987 | Apostolos | 342/192 |

Primary Examiner—Gregory C. Issing
Attorney, Agent, or Firm—Brown, Martin, Haller & McClain

[57] ABSTRACT

A system for discriminating between signals received on the mainbeam of an antenna system and signals received on the sidelobe of the antenna system. The system utilizes a main antenna and multiple auxiliary antennas. The signals received on the main antenna are coincident on one or more of the auxiliary antennas. The auxillary antenna signals are multiplexed separated for single channel processing. The main antenna signal is compared with each of the multiplexed auxiliary antenna signals. The result of these comparisons are used to determine whether the signal received on the main antenna was received on a mainbeam or a sidelobe.

11 Claims, 5 Drawing Sheets

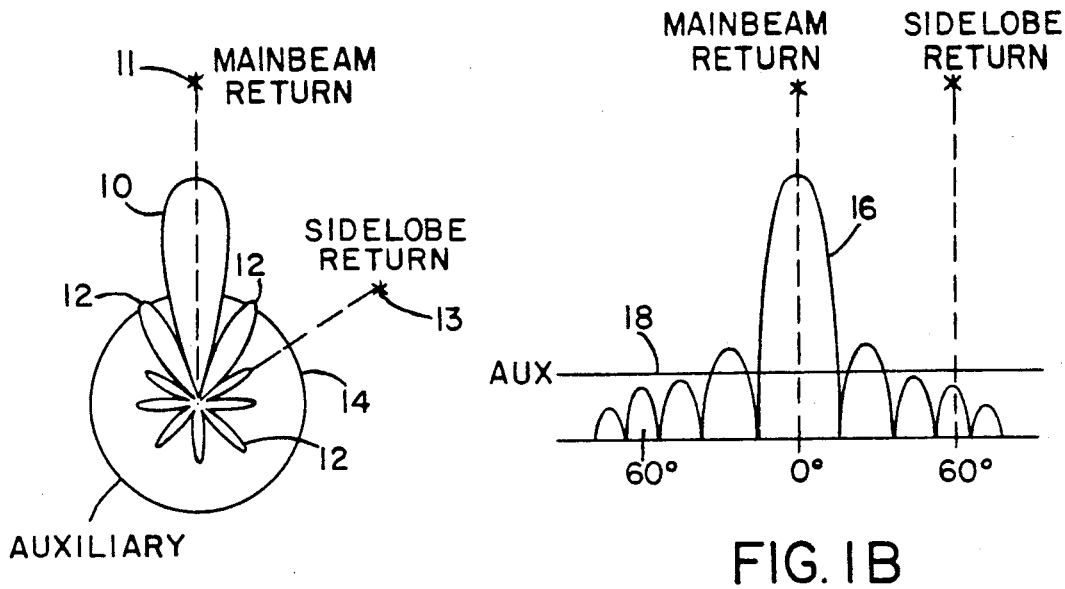
FIG. 1A
FIG. 1B
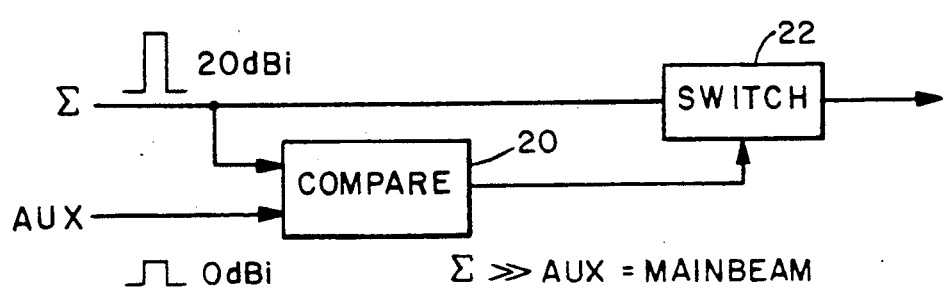
FIG. 2A
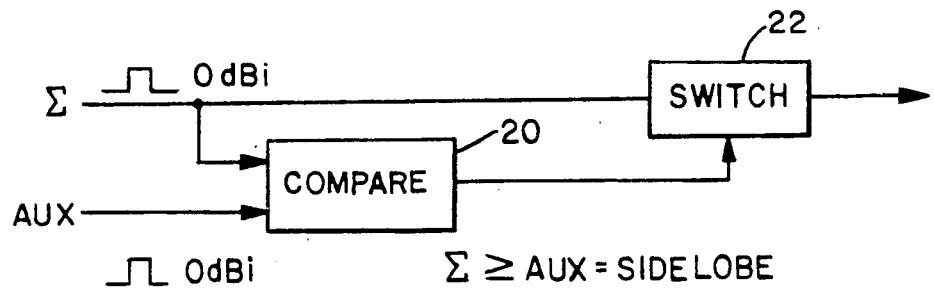
FIG. 2B

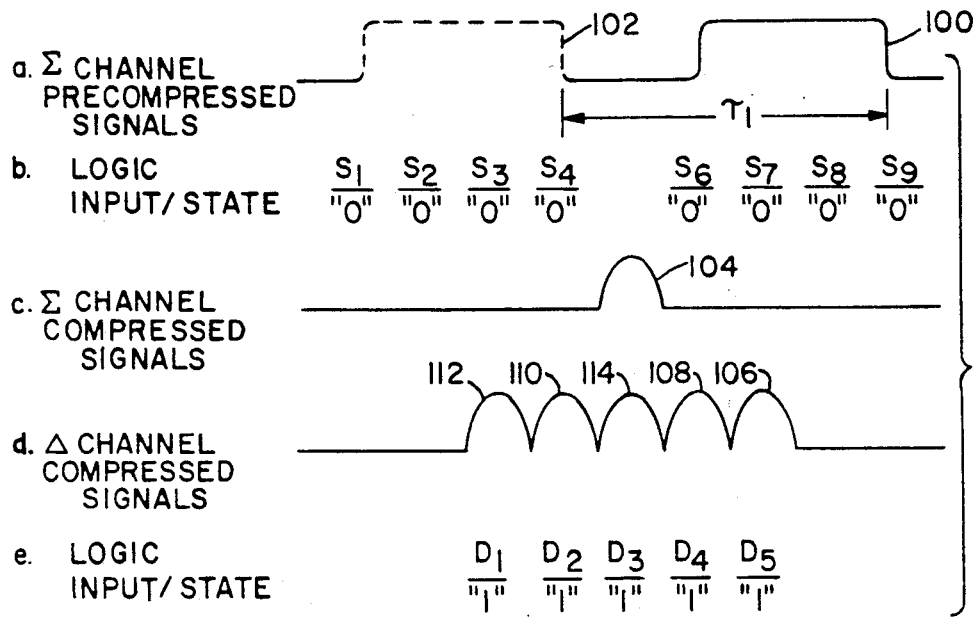
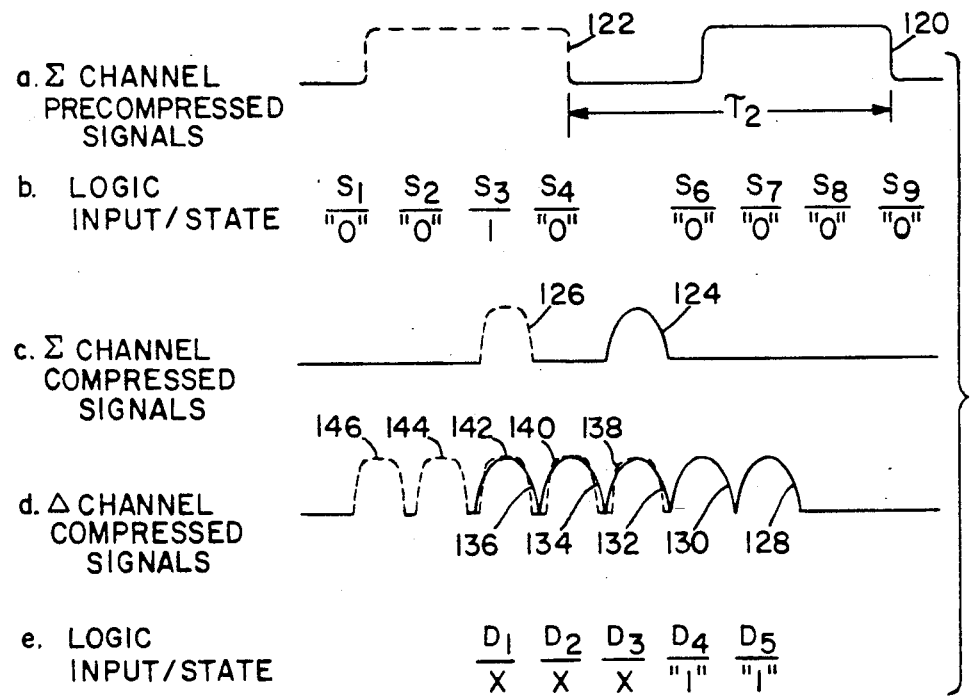

SIDELOBE IDENTIFICATION AND DISCRIMINATION SYSTEM WITH SIGNAL MULTIPLEXER-SEPARATOR

I. Field of the Invention

The present invention relates to the identification of received signals upon the sidelobes of an antenna. More specifically, the present invention relates to a novel and improved system for identifying signals on the sidelobes of a main antenna utilizing a novel technique of multiplexing, for single channel processing, coincident signals received upon auxiliary antennas corresponding to the sidelobes of the main antenna

II. Description of Related Art

In the past, communication systems have been developed that label, for identification purposes, signals transmitted on the sidelobes of the communications system antenna while not labeling mainbeam transmitted signals. A communication system receiving the transmitted signal can determine whether the signal, as received, was transmitted on the mainbeam or sidelobes of the transmitting system antenna. The signal transmitted on the sidelobes of the transmitting antenna contains the labeling and if the received signal contain such labeling it is detected. The detection of the labeling in the received signal is indicative that the received signal was transmitted on a sidelobe of the transmitting antenna.

It is also known to use in communication systems the technique of labeling signals received on the sidelobes of the receiving system antenna. The signals received on the mainbeam of the receiving antenna, however, are not labeled. In the receiving system, if the signal is received on one of the antenna sidelobes it is labeled and the labeling is detected in the receiving system. Detection of labeling in the received signal is, therefore, indicative that the signal received was received on one of the sidelobes, rather than the mainbeam, of the receiving system antenna.

Communication systems for discriminating between signals arriving on the mainbeam and the sidelobes of a receiving antenna along with communication systems for discriminating between signals transmitted on the mainbeam or transmitting antennas are known. Examples of such systems are disclosed in U.S. Pat. No. 4,250,506, entitled "Sidelobe Discriminator" issued Feb. 10, 1981, in the name of William F. McNaul, one of the inventors of the present invention, and assigned to the assignee of the present invention; and U.S. Pat. No. 4,266,226, also entitled "Sidelobe Discriminator" issued May 5, 1981, in the names of William F. McNaul and Paul R Eberhardt, both inventors of the present invention, and also assigned to the assignee of the present invention.

Each of these previous systems employ modulation of a single channel signal received on a sidelobe of the main antenna In certain instances multiple antennas are necessary to detect the sidelobe pattern of the main antenna. The use of multiple antennas result in multiple channel signals. It would therefor be advantageous to process these substantially coincident signals in a manner which allows single channel processing for sidelobe decision.

In systems other than sidelobe identification systems it may also be desirable to multiplex multiple channel overlapping signals into a single channel The multiplexed signals are communicated over a single channel to a demultiplexer which extracts the data from the multiplexed signal.

The present invention is a novel and improved system for identifying sidelobe received signals. The preferred embodiment includes an antenna system having a main antenna, in the form of a rotatable directional antenna, which has a mainbeam and at least one sidelobe. The antenna system main antenna is configured to provide sum channel and difference channel signals as is well known in the art.

The antenna system also includes an auxiliary antenna system which has an omnidirectional beam pattern. Signals received on the main and/or auxiliary antennas are typically "chirped" signals, i.e. pulses of energy monotonically increasing or decreasing in frequency. In particular in the preferred embodiment, the auxiliary antenna system is comprised of multiple "semi-omni" directional antennas which when combined form a complete omnidirectional antenna pattern. Signals received that are coincident upon the main antenna sidelobes are also coincident upon at least one of the auxiliary antennas. Thus, signals received upon one or more of the auxiliary antennas can be used to identify signals received upon the main antenna as sidelobe signals.

In utilizing multiple auxiliary antennas to obtain a full omnidirectional antenna pattern, it is possible that more than one of the auxiliary antennas will receive the signal. It is a novel feature of the present invention that the multiple auxiliary antenna signals may be multiplexed and processed in a single channel format.

In one of the preferred embodiments, the multiple auxiliary antenna signals are shifted in frequency by predetermined frequency increments and then combined into a single signal. The combined frequency shifted signal is coupled upon a difference channel that is used in processing the main antenna difference channel signals. The sum and multiplexed difference channel signals are each provided to a respective pulse compressor also known as a dispersive delay line. The delay of each pulse compressor is a function of the signal frequency. Although the auxiliary antenna signals are combined as a single signal and multiplexed with the difference channel signal each of these signals are still identifiable. Each of the coincident difference channel and auxiliary channel signals are at a difference base frequency from which they existed due to the frequency shift. Utilizing the time delay aspect of the pulse compressor, the individual pulses may be extracted from the combined pulse. Preferably the delay established by the frequency shift increment is on the order of one compressed pulsewidth thus resulting in separated pulses.

In one embodiment several of the auxiliary antenna signals may be incrementally up-converted in frequency with others being incrementally down-converted in frequency. Thus auxiliary channel signals shifted upward in frequency will occur at the output of the pulse compressor prior to the difference channel signal, which is followed by the down-converted auxiliary channel signals. Thus, the pulse compressor provides a sequence of output signals separated in time corresponding to the input frequency of each signal.

In the general sense, using the teaching of the present invention multiple signals may be multiplexed for transmission upon a single channel. By shifting the frequencies of the signals by predetermined increments, they may be transmitted in that form over a transmission line to a receiver unit. At the receiver a pulse compressor compresses the pulses with the output of the pulse compressor being the sequence of separate time delayed signals as discussed previously. Again the signals are delayed according to the frequency at which they are shifted. In the alternative, all or all but one of these signals may be incrementally shifted in frequency and combined upon a single channel. In another embodiment the signals are frequency shifted, combined and provided to a pulse compressor. The output of the pulse compressor is provided on a transmission line to a receiver where the data representative of the pulses may be extracted therefrom. In yet another embodiment time delay rather than frequency shifting may be employed.

In the preferred embodiment, it is the difference channel of the main directional antenna upon which the auxiliary antenna pulsed signals are coupled. Once all auxiliary channel signals are multiplexed with the difference channel signal on the difference channel the signal is input to the pulse compressor. The pulse compressor in effect separated the combined signal to provide individual compressed pulses, staggered in time on the same line, each corresponding to a respective auxiliary channel signal and the difference channel signal. A mainlobe/sidelobe decision process may then be implemented.

This process consists of comparing the amplitude of the post compression sum channel signal pulse with the amplitude of the corresponding post compression multiplexed signal pulses on the difference channel. A mainlobe/sidelobe decision is made based upon the relative signal pulse amplitudes. The sum channel signal pulse amplitude must be greater than the amplitude of all the difference channel multiplexed signal pulses for the received signal to be a mainlobe signal. If the amplitude of the sum channel signal pulse and any signal pulse on the difference channel is approximately equal, it is assumed that the sum channel signal has been received upon a sidelobe of the main antenna.

When a sidelobe decision is made, the output from the sum channel pulse compressor may be inhibited from being provided for later processing by a signal processor. Furthermore the difference channel signal pulses may also be inhibited from being provided for later processing. Thus the sidelobe detected signal is effectively removed from being processed, wherein the processing of such a sidelobe signal could produce erroneous data. When a mainlobe decision is made the signal is allowed to pass for processing by the signal processor.

The preferred and exemplary embodiment of the sidelobe identification and discrimination system with signal multiplexer separator of the present invention may be used in conjunction with a pulsed radar system. The radar system typically has a directional rotating antenna and feed network which in response to receiving a radar echo pulse provides corresponding sum and difference signal pulses. The received signals are typically chirped RF pulses returned from an object as an echo signal. Each of the sum and difference signals are provided upon respective sum and difference processing channels where they are input to a pulse compressor and provided to the radar processor.

An auxiliary antenna system is utilized to provide signals which enable cancellation of the sidelobe return signals. This cancellation occurs ahead of the sum and difference channel pulse compressors. In this process the auxiliary antenna channel signals are combined respectively with the sum and difference channel signals so as to cancel sum and difference channel interference. These interference cancelling signals are placed back on the sum and difference channels prior to input of channel signals to the respective channel pulse compressor. Previous attempts at utilizing the auxiliary antenna system for cancelling sidelobe return signals function for slowly varying signals, e.g. slow in variation when compared to the duration of a single pulse.

It is therefore an object of the present invention to provide a sidelobe identification and discrimination (SLID) system that can instantaneously identify whether a received signal arrived on the mainbeam or a sidelobe of a directional antenna. Utilizing the SLID system of the present invention a received sidelobe signal is identified in real time on a pulse by pulse basis. A signal identified as a sidelobe received signal shall be removed from the real time processing of sum channel data. A sidelobe signal thus will not be erroneously interpreted as a mainbeam signal. Removing sidelobe signals from the processor input results in only mainbeam signals being processed. The use of the SLID system of the present invention provides faster response in removal of sidelobe data than previous systems.

In the exemplary embodiment disclosed herein, the auxiliary antenna system is comprised of multiple "semi-omni" antennas which when combined provide a full omnidirectional antenna pattern. These signals are multiplexed with the main antenna difference channel signal upon the difference channel for compression and comparison with the compressed sum channel. This comparison is used in the decision as to whether the received signal is received upon the main antenna mainbeam or sidelobe.

The present invention may be viewed as consisting of two separate processes. The first process is a multiplexing-separating technique which first adds the signals received from the auxiliary antennas onto the difference channel of the main antenna for single channel processing and separates these signals in time on that channel. The second process is a technique by which the sum channel signal and the difference channel multiplexed signals are detected, compared and from which sidelobe signal identification and rejection decisions made.

It is therefore an object of the present invention to provide a novel and improved method for signal multiplexing-separating for single channel processing.

It is yet a further object of the present invention to provide a novel and improved signal identification and discrimination system which includes unique signal multiplexing techniques.

BRIEF DESCRIPTION OF THE DRAWINGS

These and other features, objects and advantages of the present invention will become more apparent from the detailed description set forth below when taken in conjunction with the drawings in which like reference characters identify correspondingly throughout and wherein:

FIGS. 1a and 1b respectively illustrate antenna patterns and corresponding power levels associated with the antenna patterns;

FIGS. 2a and 2b are schematical diagrams of two conditions in which a mainbeam and a sidelobe decision are respectively made;

FIG. 5 in graphs 5a-5e illustrate exemplary corresponding pulse diagrams and logic inputs for sidelobe determination of a received signal;

FIG. 6 in graphs 6a-6e illustrate exemplary corresponding pulse diagrams and logic inputs for sidelobe determination of a received signal;

DETAILED DESCRIPTION OF THE PREFERRED EMBODIMENTS

Figure 3:
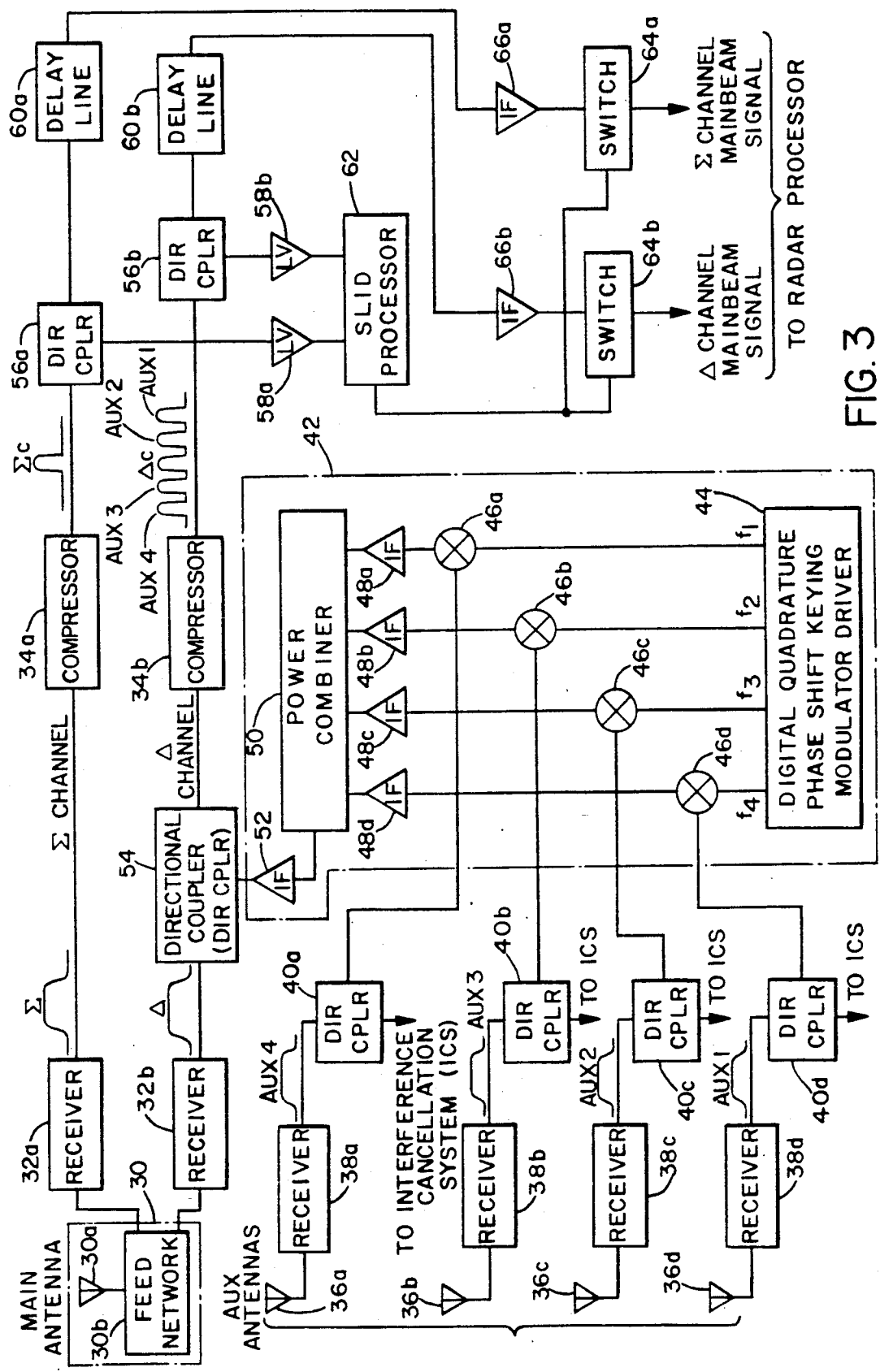
FIG. 3 is a schematical diagram of an exemplary application of the sidelobe identification and discrimination system with signal multiplexer-separator of the present invention adapted for use with a radar system.

Referring now to FIG. 1a, there is shown in schematical form the antenna pattern of a main antenna in particular for sum channel signals, and the antenna pattern of an omnidirectional auxiliary antenna system. The main antenna disclosed herein with respect to the preferred embodiment is a rotating directional antenna having a mainlobe or mainbeam 10 and a plurality of sidelobes 12.

The auxiliary antenna system has a beam pattern 14 which substantially encompasses main antenna sidelobes 12.

FIG. 1a illustrates the case when a return echo from object 11 is received in main antenna mainbeam 10 which provides a sum channel signal corresponding to signal strength according to curve 16 of FIG. 1b In FIGS. 1a and 1b, object 11 is positioned on the boresight axis of the main antenna which results in a signal of maximum strength.

FIG. 1a also illustrates a different case when the return echo from object 13 is substantially off the boresight axis of main antenna mainbeam 10. However the return echo from object 13 is received in one of sidelobes 12 of the main antenna. A sidelobe return provides a sum channel signal also corresponding to curve 16 of FIG. 1b.

As can be seen from FIG. 1b a mainbeam receive signal is significantly greater in power in most instances than a sidelobe received signal. For example, when the main antenna boresight is aligned (0 degrees) with object 11, the mainbeam return is much greater than the sidelobe return from object 13 which is 60 degrees off boresight of the main antenna FIG. 1b also illustrates by curve 18 the relative signal strength of signals received in auxiliary antenna beam pattern 14. From FIG. 1b, one can see that the power of a sidelobe received signal is about the same or less than a signal received on the auxiliary antenna. A comparison of the power in a main antenna received signal with the same signal as coincident upon the auxiliary antenna can provide an indication as to whether the main antenna received signal is a mainbeam or sidelobe signal.

FIGS. 2a and 2b respectively illustrate the conditions in which the circuitry is able to make a mainbeam and sidelobe decision. In FIGS. 2a and 2b a comparison is made between the amplitudes of a compressed sum channel signal and an auxiliary channel signal. The auxiliary antenna system of FIGS. 1a and 1b is considered an omnidirectional antenna with a gain of 0 dBi. A signal arriving on the mainbeam of the main antenna will exhibit a signal strength greater, approximately 20 dBi greater, than that of the same signal also received upon the auxiliary antenna when compressed. However, a signal arriving upon a sidelobe of the main antenna will produce an output of the same order of magnitude as that developed by the auxiliary antenna.

In FIGS. 2a and 2b, the compressed sum channel signal is input along with the auxiliary channel signal into a compare element 20. Compare element 20 compares the relative amplitude of the signals and provides a control signal to a switch element 22. The compressed sum channel signal is also input to switch 22.

As illustrated in FIG. 2a, the relative magnitude of the compressed sum channel signal is much greater than the auxiliary antenna signal. Therefore, compare element 20 provides a first control signal indicating that the sum channel signal is a mainbeam received signal. This first control signal is provided to switch 22 which in response thereto permits the sum channel signal to pass through switch 22 to a radar processor (not shown).

In FIG. 2b both the compressed sum channel signal and the compressed auxiliary antenna signal are input to compare element 20. Compare element 20 determines that the sum channel signal is less than or about equal to the auxiliary antenna signal and provides a second control signal to switch 22. The second control signal is indicative of the condition that the sum channel signal was received on the sidelobe of the main antenna. Accordingly, compare element 20 provides the second control signal to switch 22 to inhibit the sum channel signal from passing to the radar processor (not shown).

The preferred embodiment of the SLID system of the present invention is described with reference to a radar system. Referring to FIG. 3, the radar system has a main antenna system 30 which includes a rotating directional antenna 30a and a feed network 30b which provides sum and difference channel signals as is well known in the art. Main antenna 30 receives an RF signal, typically a chirped pulse, reflected from an object as the result of the transmission of a corresponding radar pulse. Signals received on the mainbeam and sidelobes of main antenna 30a are output from feed network 30b as a sum channel signal as is well known in the art. The sum channel signal is coupled to receiver 32a which converts the RF signal to an IF frequency. The output of receiver 32a is coupled to the input of a pulse compressor 34a, typically a dispersive delay line, which compresses the pulse as is well known in the art. The output of compressor 34a is typically provided to a radar processor (not shown). Similarly, signals received upon a sidelobe of main antenna 30a are output from feed network 30b as a difference channel signal as is well known in the art. The difference channel signal is input to receiver 32b which converts the RF signal to an IF frequency. The output of receiver 32b is coupled to pulse compressor 34b. In conventional radar systems the output of compressor 34b is also provided to the radar processor (not shown).

In the particular radar system to which the present invention was designed, the radar system includes four "semi-omni" auxiliary antennas. These auxiliary antennas in essence function as a single omnidirectional antenna having beam pattern 14 as indicated in FIG. 1a illustrated in FIG. 3, the radar system has auxiliary antennas 36a—36d which form separate auxiliary antenna channels. The signals received on auxiliary antennas 36a-36d are coupled through a respective receiver 38a-38d. Each receiver 38a-38d converts the received RF signal to an IF signal. Signals are provided from receivers 38a-38d to an existing interference cancellation system (not shown). Each receiver 32a—32b and 38a–3Bd provide a respective output signal at an IF frequency modulated by the frequency of the chirped pulse.

In order to provide signal comparison, as discussed with reference to FIGS. 2a and 2b, in a system such as disclosed in FIG. 3 having multiple auxiliary antennas, the auxiliary antenna signals can be combined or multiplexed upon the difference channel with the difference channel signal. The multiplexed signals after may be compared with the sum channel signal because they are separated. Using a multiplexing-separating scheme significantly reduces the amount of hardware required to process individual channel signals.

As illustrated in FIG. 3, a directional coupler 40a–40c is coupled to the output of each respective receiver 38a–38d. Directional couplers 40a–40d couple a portion of the respective auxiliary antenna signal that is provided normally to the interference cancellation system to multiplexer section 42. Section 42 is comprised of digital quadrature phase shift keying modulator driver 44, mixers 46a–46d, IF amplifiers 48a–48d, power combiner 50 and IF amplifier 52.

A portion of the signal output from receiver 38a is coupled by directional coupler 40a to one input of mixer 46a. Similarly, directional couplers 46b–46d couple a portion of the respective signals to a respective mixer 46b–46d. The other input to each respective mixer 48a–48d is provided by modulator driver 44. Modulator driver 44 provides signals at frequencies $f_1$–$f_4$ respectively to the other inputs of mixers 46a–46d. The frequency $f_2$ is at a frequency such that when mixed with the IF signal input thereto from receiver 38, the output frequency of the signal from mixer 46b is increased by a predetermined frequency increment $\Delta f$. Similarly, the frequency $f_1$ is set such that the output signal from mixer 46a is shifted in frequency equal to two predetermined frequency increments, $2\Delta f$. The frequencies $f_3$ and $f_4$ in this particular arrangement respectively provide at the outputs of mixers 46c and 46d a shift down in frequency down by one and two predetermined frequency increments, $-\Delta f$ and $--\Delta f$.

The frequency shifted outputs from mixers 46a–46d are input to IF amps 48a–48d. IF amps 48a–48d amplify the frequency shifted signals and provide the amplified outputs to power combiner 50. Power combiner 50 combines these signals into a single channel signal which is provided to IF amplifier 52. IF amplifier 52 amplifies this single channel signal and provides it to directional coupler 54.

Directional coupler 54 is disposed in the difference channel between receiver 32b and compressor 34b. Directional coupler 54 is utilized to combine the signal provided from IF amplifier 52 with the difference channel signal to provide a single multiplexed signal. Only the output of receiver 32b is unshifted in frequency, whereas the signals received from auxiliary antennas 36a–36d are each uniquely frequency shifted by mixers 46a–46d, repsectively. Compressors 34a and 34b are typical pulse compressors in which the time delay of the signal passing therethrough is proportional to the frequency of the signal. The time delay may be inversely proportional to frequency for signals monotonically increasing in frequency or directly proportional to frequency for signals monotonically decreasing in frequency. With regards to directional coupler 54 and the combination of signals from receivers 32b and 38a–38d, it is implicit that only the signal from receiver 32b remains unshifted in frequency.

In the exemplary embodiment, a signal received from receiver 38a is shifted up in frequency by two frequency increments above the basic receiver IF frequency. Thus this signal is delayed the least amount of time as it is output from pulse compressor 36b. Since the signal output from receiver 38b to pulse compressor 36b is shifted up in frequency by one frequency increment above the IF frequency, it is delayed the second least amount of time as output from compressor 34b. The frequency increment $\Delta f$ selected for section 42 should be sufficient to ensure that there is no overlap in the compressed pulses. For example, the frequency difference must be at least one divided by the uncompressed signal pulse width.

The sum channel signal along with the difference channel signal are provided simultaneously as output from compressors 34a and 34b next in time since they are at the normal IF frequency. A signal provided from receiver 38c is shifted down in frequency by one frequency increment and is thus output from compressor 34b next. Similarly, a signal provided from receiver 38d shifted down in frequency by two frequency increments thus would be output from compressor 24b as the last signal. In total the signals output from compressor 34b are separated in time according to the IF frequency to which it corresponded when input to the pulse compressor. It is readily understood that the signals from receivers 38a–38d need not be in the particular order as described. For example, the auxiliary antenna channel signals may all be shifted up or down in frequency with respect to the IF frequency.

Although not illustrated in FIG. 3, section 42 may include filters for filtering out unwanted frequencies at the output of the respective mixers Section 42 as illustrated is but one exemplary form of providing frequency shifts. It is readily understood to one of ordinary skill in the art that other techniques for frequency shifting may be utilized.

The signals output from compressors 34a and 34b are respectively coupled to directional couplers 56a and 56b. Directional coupler 56a couples a portion of the sum channel compressed signal pulse energy to log video amplifier 58a while the majority of the signal energy is coupled to delay line 60a. Similarly, directional coupler 56b couples a portion of the difference channel multiplexed-separated signal pulse energy to log video amplifier 58b while the majority of the signal energy is coupled to delay line 60b. The outputs of log video amplifiers 58a and 58b are coupled to SLID processor 62.

SLID processor 62 compares the relative amplitudes of the sum channel signal pulse with the multiplexed-separated difference channel signal pulses in order to make a mainlobe/sidelobe decision. Furthermore, SLID processor 62 in making its decision must detect for overlapping multiplexed signals corresponding to different but closely spaced apart pulses received on the main antenna.

Should a comparison of the sum and difference channel signals indicate that the sum channel signal was one received on a sidelobe, SLID processor 62 provides a control signal. This control signal is provided to switches 64a and 64b which are disposed in the sum and difference channels between delay lines 60a and 60b and the radar processor. While signals are being compared in SLID processor 62 for mainlobe/sidelobe decision, the signals are also input to delay line 60a and 60b. The outputs of delay lines 60a and 60b are respectively coupled to IF amplifiers 66a and 66b. The output of IF amplifier 66a and 66b are respectively coupled to switches 64a and 64b.

Delay lines 60a and 60b are used to delay the received signal such that SLID processor 62 has time to make a decision, based upon comparison of the sum channel signal with the multiplexed difference channel signals, before the signals are output from the delay lines. Should the sum channel signal be deemed a mainbeam received signal, the sum channel signal is passed through delay line 60a and IF amplifier 66a, where amplified and, on through switch 64a to the radar processor. However, should the control signal be provided by SLID processor 62 be indicative of a sidelobe received signal, switch 64a inhibits the passage of the sum channel signal to the radar processor. Similarly switch 64b inhibits the difference channel signals from passing on to the radar processor when the received signal is determined to be received on the sidelobe. Delay lines 60a and 60b are utilized to provide a small delay in the signals sufficient to permit the SLID processor to make a comparison of the sum channel signal with each of the multiplexed difference channel signals. SLID processor 62 provides the control signal when a sidelobe decision is made so as to inhibit the sum channel signal and the difference channel signal, along with the auxiliary channel signals, from passage to the radar processor.

Figure 4:
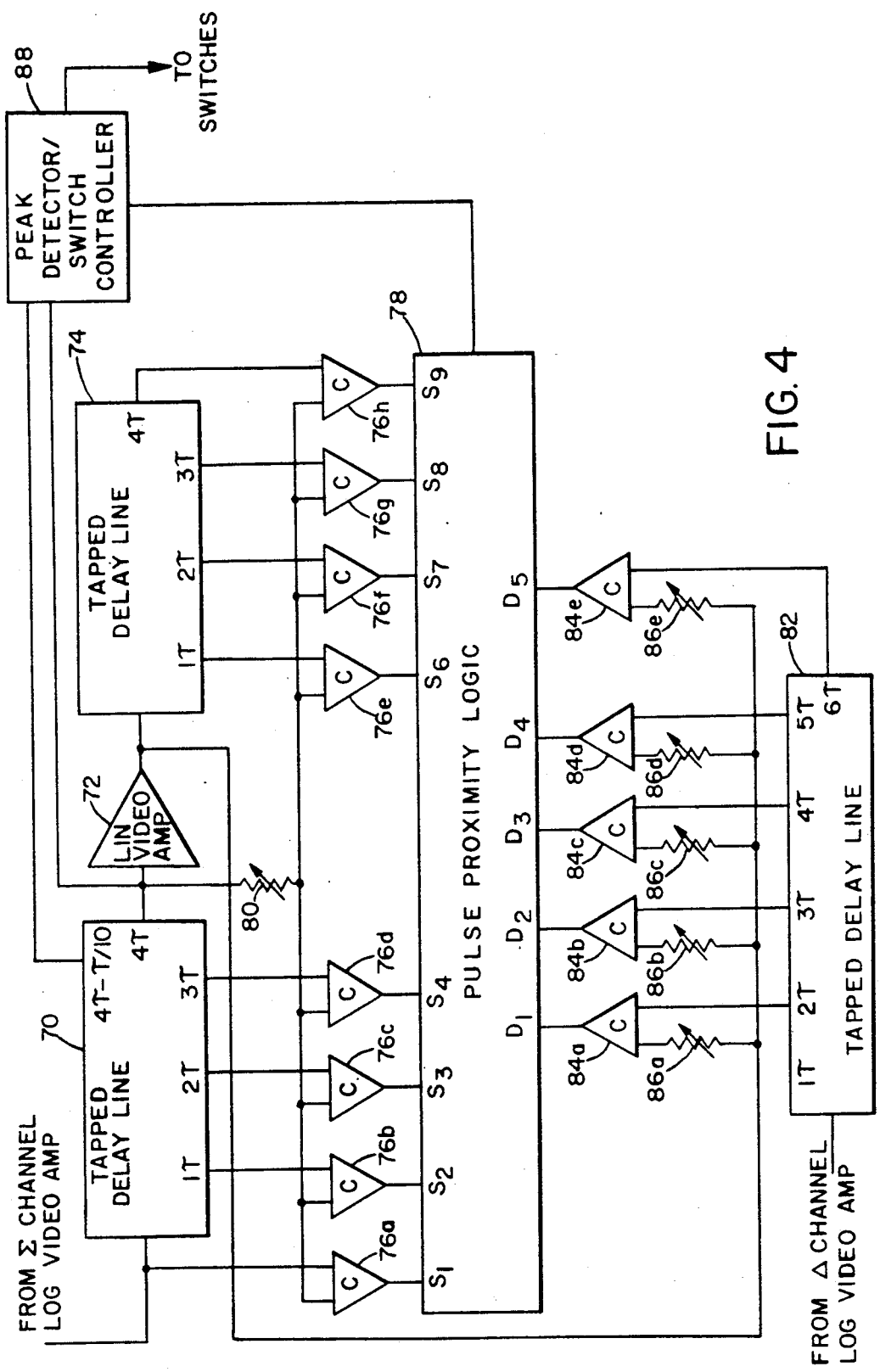
FIG. 4 is a schematical diagram of the SLID processor of FIG. 3.

FIG. 4 illustrates in further detail SLID processor 62 of FIG. 3. SLID processor 62 receives the sum channel signal from log video amplifier 58a where it is input to tapped delay line 70. Delay line 70 includes taps for delaying the signal at $1\tau, 2\tau, 3\tau, 4\tau - \tau/10\ 4\tau$. The output from the $4\tau$ tap of delay line 70 is coupled to the input of a linear video amplifier 72. Linear video amplifier 72 amplifies the signal to compensate for signal loss occurring in delay line 70. The output of amplifier 72 is coupled to the input of tap delay line 74. Delay line 74 has tapped outputs at $1\tau, 2\tau, 3\tau$ and $4\tau$.

The input of delay line 70, i.e. the output from log video amplifier 58a is coupled to an input of comparator 76a. Delay line 70 has the taps $1\tau, 2\tau$ and $3\tau$ respectively coupled to one input of comparators 76b–76d. Delay line 72 has taps $1\tau, 2\tau, 3\tau$ and $4\tau$ respectively coupled to one input of comparators 76e–76h. The $4\tau$, tap of delay line 70 is coupled through variable resistor 80 to the other input of comparators 76a–76h. The output of each comparator 76a–76d is coupled to a respective input S1–S4 of pulse proximity logic 78. Similarly the output of each comparator 76e–76h is respectively coupled to the S6–S9 inputs of pulse proximity logic 78.

The output from log video amplifier 58b is coupled to tapped delay line 82. Delay line 82 has taps $2\tau, 3\tau, 4\tau, 5\tau$ and $6\tau$ coupled to a respective input of comparators 84a–84e. The output of linear video amplifier 72 is also coupled through a respective variable resistors 86a–86e to the other input of each respective comparator 84a –84e. The output of each comparator 84a –84e is coupled to a respective input D1–D5 of pulse proximity logic 78.

Comparators 84a –84e are used to make a comparison between the amplitude of the compressed sum channel pulse with the compressed difference channel pulse and each of the compressed auxiliary channel pulses to determine whether the signal received is a mainbeam or sidelobe signal. Resistors 86a–86e set the threshold level for sidelobe comparison. In the comparison process, for example, should all of the outputs of comparators 84a –84e be a logical "0", this condition would indicate that the sum channel signal is greater than the difference channel and auxiliary channel signals. This condition would correspond to a mainbeam received signal. However, should the comparison result in an output from one or more of comparators 84a –84e being a logical "1" for example, this would indicate that the sum channel signal is equal to or less than one of the difference channel and auxiliary channel signals. This condition would correspond to a sidelobe received signal.

Pulse proximity logic 78 is constructed typically as a combinational logic unit. Pulse proximity logic 78 provides an output control signal in response to the output of comparators 84a –84e. In this example should one of the outputs of comparators 84a –84e be a logical "1", pulse proximity logic 78 would provide a control signal indicative of the received signal being one received on a sidelobe.

However, there exists the possibility that the main antenna and auxiliary antennas may receive signals which are less than or equal to five compressed pulsewidths $(5\tau)$ apart. In this particular case there would be an overlap of the multiplexed pulses on the difference channel. Thus in the comparison process using comparators 84a –84e, overlapping pulses can corrupt the results. Thus a check is made for this overlapping multiplexed pulse condition so that pulse proximity logic 78 does not provide an incorrect control signal.

Delay lines 70 and 72 along with comparators 76a–76h are utilized to inspect for sum channel signal pulses within a time period which would cause an overlap in the multiplexed compressed pulses on the difference channel. The operation of this portion of the circuit is described later with reference to FIGS. 5 and 6.

Delay line 70 also includes a tap whose delay is slightly less than $4\tau$. In this particular case the $4\tau - \tau/10$ tap is coupled to peak detector/switch control logic 88. Furthermore the $4\tau$ tap is also coupled to detector/controller 88. Detector/controller 88 utilizes the outputs of delay line 70 to detect when the peak of the sum channel pulse as it passes through delay lines 70 and 74 is at the $4\tau$ tap of delay line 70.

The result of the comparison with the sum channel compressed pulse with the difference channel multiplexed compressed pulses and the pulse overlap detection, enables logic 78 to provide an output signal indicative of a sidelobe received pulse. This control signal is provided to detector/controller 88. Detector/controller 88 provides a signal output therefrom that is used to control switches 64a and 64b. Detector/controller 88 ensures that a mainbeam/sidelobe decision is made from a comparison of the sum channel pulse with the difference channel multiplexed pulses at the peak of the sum channel compressed pulse.

FIGS. 5 and 6 correspond to different cases of signal reception. With respect to FIG. 5a a time lag between pulse 100 and pulse 102 is $\tau_1$. The time period $\tau_1$ is greater than or equal to five compressed pulse widths, i.e. $5\tau_c$, of the same pulse. For purposes of discussion $\tau_1 = 5\tau_c$. FIGS. 5b–5e when considered together form a snapshot of the condition of the delay line taps and logic inputs at a time when the peak of the compressed sum channel pulse 104, which corresponds to pulse 100, is at the $4\tau$ tap of delay line 70. FIG. 5d illustrates five compressed pulses on the difference channel which correspond to the compressed pulse on the sum channel. However, non-overlap in beam pattern of the auxiliary antennas may result in certain of these pulses to be not present since no signal was received on the corresponding auxiliary antenna. The instant the peak of pulse 104 is at the $4\tau$ tap of delay line 70, a valid comparison is made by comparators 76a-76h to detect the presence of another compressed sum channel pulse less than five compressed pulsewidths away either proceeding or following in time. Thus, for example should no pulses be within the time span of interest of pulse 104, comparators 76a-76h provide, for example, a logical "0" signal at the S inputs of pulse proximity logic as illustrated by FIG. 5b.

A comparison is also made of the relative amplitude of sum channel compressed pulse 104 with the multiplexed auxiliary antenna pulses 106, 108, 110, 112 and the difference channel pulse 114. Should the amplitude comparison result in the amplitude of the pulse 104 being equal to or less than pulses 106, 108, 110, 112 and 114, for each comparison, a logical "1" is output from the corresponding comparator 84a -84e to the corresponding D input of pulse proximity logic 78.

When no RF signal is detected as being received within five compressed pulse widths of the RF signal of interest, i.e. pulse 102 relative to pulse 100, the result of each comparison of the sum channel pulse 100 with each different channel pulse is deemed valid. These results are thus used to determine whether the received RF signal is a mainbeam or sidelobe signal.

In the case illustrated in FIG. 5a-5e, logical "1" signals are provided to the D inputs of pulse proximity logic while logical "0" signals are provided to the S inputs. Under these conditions pulse proximity logic 30 provides a signal to detector/controller 88. Since detector/controller 88 also has detected the comparison was made at the peak of the sum channel pulse an "open" control signal is provided to the switches. In response to this "open" signal, the switches inhibit the sidelobe received pulse from passing on to the radar processor.

However, should no RF signal, such as pulse 102, be detected as being within less than five compressed pulse widths of the RF signal of interest, pulse 100, and the compressed sum channel pulse is greater in amplitude than the difference channel pulses, pulse proximity logic 78 does not provide the control signal to detector/controller 88. As a result, detector/controller 88 does not provide the "open" signal to switches 64a-64b. Thus, the sum and difference channel signals pass to the radar processor as mainbeam signals.

FIG. 6 illustrates the condition where a received pulse 120 is followed by another received pulse 122 that is less than five compressed pulse widths i.e., $\tau_2 \leq \tau_1$. In this particular case $\tau_1 = \tau_2 + 2\tau_c$. FIG. 6d illustrates the compressed sum channel pulses corresponding to pulses 120 and 122, pulses 124 and 126. Similarly FIG. 6c illustrates the compressed difference channel pulses corresponding to pulse 120, pulses 128, 130, 132, 134 and 136; and to pulse 122, pulses 138, 140, 142, 144 and 146.

With reference to FIGS. 6b-6e, pulse 124 is in time with its peak at the 4: output of delay line 70. Comparators 76a -76h compare the amplitude of pulse 124 with any pulse appearing at the input of delay line 70 and the output taps of delay lines 70 and 74 as previously discussed. In the example illustrated in FIGS. 6a -6e, at the $2\tau$ tap of delay line 70 the pulse 126 appears. Each 21 comparator 76a -76b and 76d-76h provide a logical "0" signal to a respective S input of pulse proximity logic 78. However, comparator 76c provides a logical "1" signal to the S3 input pulse proximity logic 78. A logical "1" provided to an S input of pulse proximity logic 78 indicates that there is an overlap in the multiplexed pulses on the difference channel. In the case as illustrated, pulses 132, 34 and 136 respectively overlap pulses 138, 140 and 142. This pulse overlap of the multiplexed pulses can corrupt the amplitude comparison results that are input to the D inputs of pulse proximity logic 78. This corrupt data cannot be used to make a valid sidelobe decision.

Figures 7, 8:
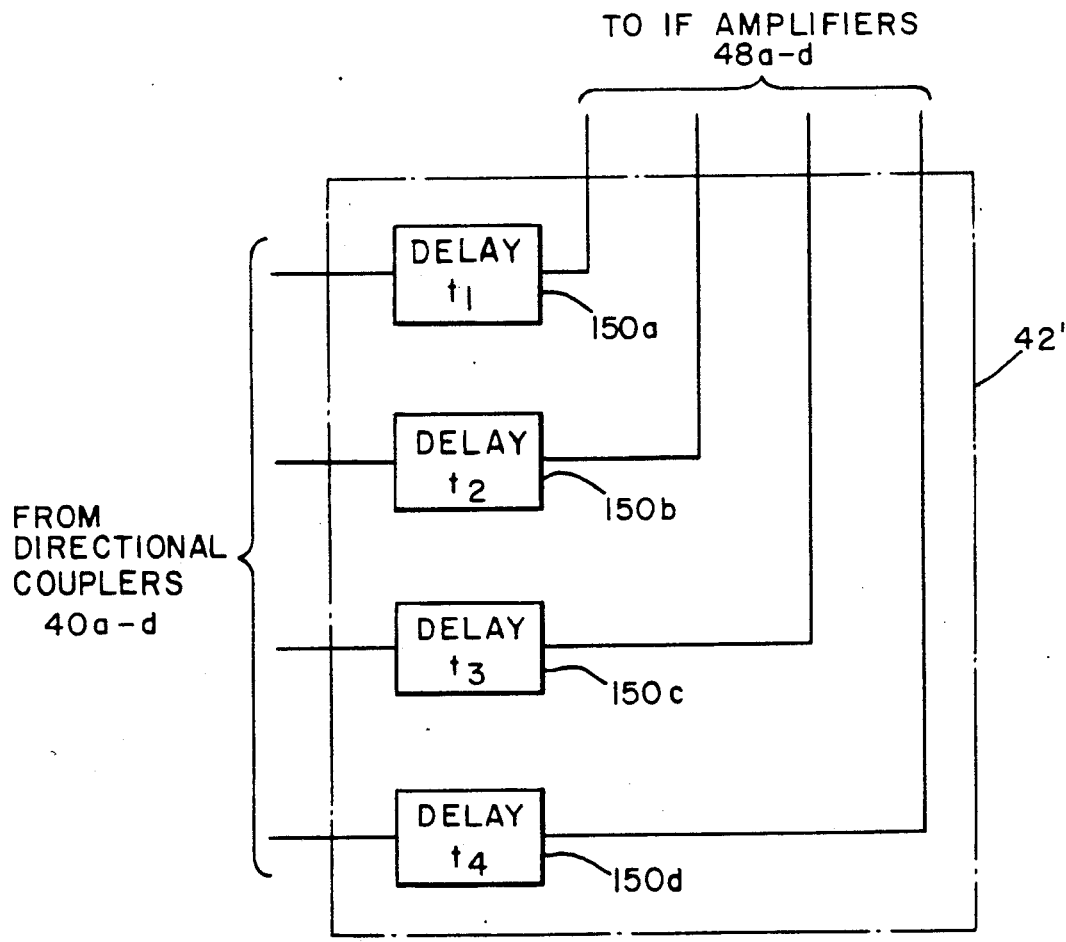
FIG. 7 is a diagram illustrating corrupted comparison data for overlapping pulses which are disregarded for sidelobe discrimination decisions.
FIG. 8 is an alternate embodiment of a portion of the multiplexing-separating scheme as illustrated in FIG. 3.

FIG. 7 is a chart to which pulse proximity logic 78 corresponds in making a decision to ignore sum channel/difference channel pulse amplitude comparisons. For each S input that is a logical "1", a corresponding "x" is placed in the chart for each D input that is ignored. For example if a logical "1" is provided to the S3 input of pulse proximity logic 78, it ignores the result of the amplitude comparisons of pulse 124 with pulses 132, 134 and 136. Thus, the inputs D1, D2 and D3 of pulse proximity logic are ignored (indicated by dashed 148).

Therefore, with respect to pulse 124 the decision as to whether pulse 124 corresponds to a sidelobe must be made with respect to the amplitude comparison of pulse 124 with difference channel pulses 128 and 130. The result of this comparison is respectively provided to the D5 and D4 inputs of pulse proximity logic 78. In the case illustrated in FIGS. 6a -6e, the comparison indicates that pulse 124 is not significantly greater in amplitude than either pulses 128 and 130. Accordingly a logical "1" is provided at the D5 and D4 inputs of pulse proximity logic 78. Although logic signals are provided to the D1-D3 inputs of pulse proximity logic 78, these signals are ignored and the mainbeam/sidelobe decision is based only on the D4 and D5 inputs. Based upon D4 and D5 inputs, pulse proximity logic 79 provides a signal to detector/controller 88. At the instant peak determination is made, detector/controller 88 provides the "open" signal to switches 64a and 66b so as to inhibit the pulses from being coupled to the radar processor.

FIG. 8 illustrates an alternate embodiment of section 42 of FIG. 3. Section 42 was described with reference to FIG. 3 as providing a shift in signal frequency. However, it is possible to provide a different time delay for each of the coincident pulses received from a different antenna. These signals are then combined into a single channel signal FIG. 8 illustrates section 42' which is comprised of time delay elements 150a-150d which provide incremental time delays in the simultaneously received signals. In this particular embodiment without a time delay in the difference channel the auxiliary antenna signals would follow the difference channel pulse in time as output from the pulse compressor. Also implicit in this alternative embodiment is the fact that only the difference signal is unshifted in time, whereas each of the auxiliary antenna signals is shifted in time by a unique value so that the pulse from those antennas and the difference channel are separable by the compressor.

It is further understood that the teachings of the present invention with respect to the signal multiplexing-separating may also be used in various communications systems. It is the adaption of the many to one channel multiplexing-separating coincident signals utilizing a pulse compressor enables single channel processing of the multiplexed data. It is further envisioned that minor variations of the inventions may be readily made by one of ordinary skill in the art. For example. in the preferred embodiment a variation can be anticipated in that the RF signals themselves are multiplexed rather than using IF signals.

Therefore, the previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

We claim:

1. In a receiver system for receiving and preprocessing chirped RF pulses, a system for identifying main antenna sidelobe received pulses, said receiver system having a main antenna system with a directional antenna that has a mainlobe and at least one sidelobe for collecting said RF pulses and providing corresponding sum and difference channel pulses according to the directional position of said directional antenna relative to the source of said RF pulses, a sum channel and a difference channel pulse compressor each having an input coupled to said main antenna system for respectively receiving said sum and difference channel pulses and providing corresponding compressed pulses at respective outputs thereof for coupling to a pulse processor, and said receiver system further having a plurality of auxiliary antennas for receiving ones of said RF pulses coincident upon the sidelobes of said direction antenna and providing corresponding auxiliary channel pulses, said sidelobe identification system comprising:

multiplexer-separating means coupled to each auxiliary antenna system for, receiving each of said auxiliary channel pulses, conditioning each auxiliary channel pulse according to a predetermined conditioning parameter, combining said conditioned auxiliary channel pulses with said difference channel pulse as input to said difference channel pulse compressor, wherein said difference channel pulse processor provides an output sequence of spaced apart compressed pulses each corresponding to a respective one of said difference channel and auxiliary channel pulses; and sidelobe identification means coupled to sum and difference channel pulse compressors for, receiving said sum channel compressed pulse and said sequence of difference channel and auxiliary channel compressed pulses, comparing the amplitude of said sum channel compressed pulse with the amplitude of each pulse in said sequence of pulses, and providing a sidelobe identification signal when the amplitude of one of said pulses in said sequence of pulses is at least as great as the amplitude of said sum channel compressed pulse.

2. The sidelobe identification system of claim 1 wherein said sidelobe identification means is further for detecting an overlap in auxiliary channel pulses corresponding to successive RF pulses received upon said main and auxiliary antenna systems.

3. The sidelobe identification system of claim 1 further comprising switch means coupled to said sum pulse compressors for receiving said sum channel compressed pulse and said sidelobe identification means for receiving said sidelobe identification signal, said switch mean responsive to said sidelobe identification signal for disabling the coupling of said sum channel compressed pulse to said pulse processor.

4. The sidelobe identification system of claim 1 wherein said multiplexer means comprises:

frequency shift means for, receiving said auxiliary channel pulses, shifting each one of said received auxiliary channel pulses in frequency by a predetermined frequency increment, and providing an output of each frequency shifted pulse; and combiner means for, receiving said frequency shifted pulses, combining said frequency shifted pulses with said difference channel pulse a single pulse.

5. The sidelobe identification system of claim 1 wherein said multiplexer mean comprises:

time delay means for, receiving said auxiliary channel pulses, delaying each one of said received auxiliary channel pulses by a predetermined time increment, and providing an output of each time delayed pulse; and combiner means for, receiving said time delayed pulses, combining said time delayed pulses with said difference channel pulse as a single pulse.

6. A signal multiplexer-separator comprising:

frequency shift means for receiving in parallel a set of substantially coincident signal pulses linearly swept in frequency, shifting in frequency each of said received pulses by a predetermined frequency increment and providing an output of said frequency shifted pulses;

combiner means for receiving said frequency shifted pulses, combining said frequency shifted pulses into a single combined pulse and providing an output of said combined pulse; and compressor means for receiving said combined pulse, providing a time delay in said combined pulse proportional to frequency components of said combined pulse and providing a sequence of output pulses each corresponding to a respective received pulse, each output pulse shorter in duration than a corresponding received pulse and separated in time with respect to each other.

7. The signal multiplexer-separator of claim 6 wherein one of said received pulses is shifted in frequency by a frequency increment of zero.

8. The signal multiplexer-separator of claim 6, wherein said compressor means comprises a dispersive delay line having an input coupled to said combiner means and an output for providing said plurality of output pulses.

9. A signal multiplexer-separator comprising:

time delay means for receiving a parallel a set of substantially coincident signal pulses linearly swept in frequency, delaying each of said input pulses by a predetermined time increment and providing an output of said time delayed pulses;

combiner means for receiving said time delayed pulses, combining said time delayed pulses into a single combined pulse and providing an output of said combined pulse; and compressor means for receiving said combined pulse, providing time delay in said combined pulse proportional to frequency components of said combined pulse and providing a sequence of output pulses each corresponding to a respective received pulse, each output pulse shorter in duration than a respective received pulse and separated in time with respect to each other.

10. The signal multiplexer-separator of claim 9 wherein one of said received pulses is delayed by a increment of zero.

11. The signal multiplexer-separator of claim 9 wherein said compressor means comprises a dispersive delay line having an input coupled to said combiner means and an output for providing said plurality of output pulses.

* * * * *